Figure 1:
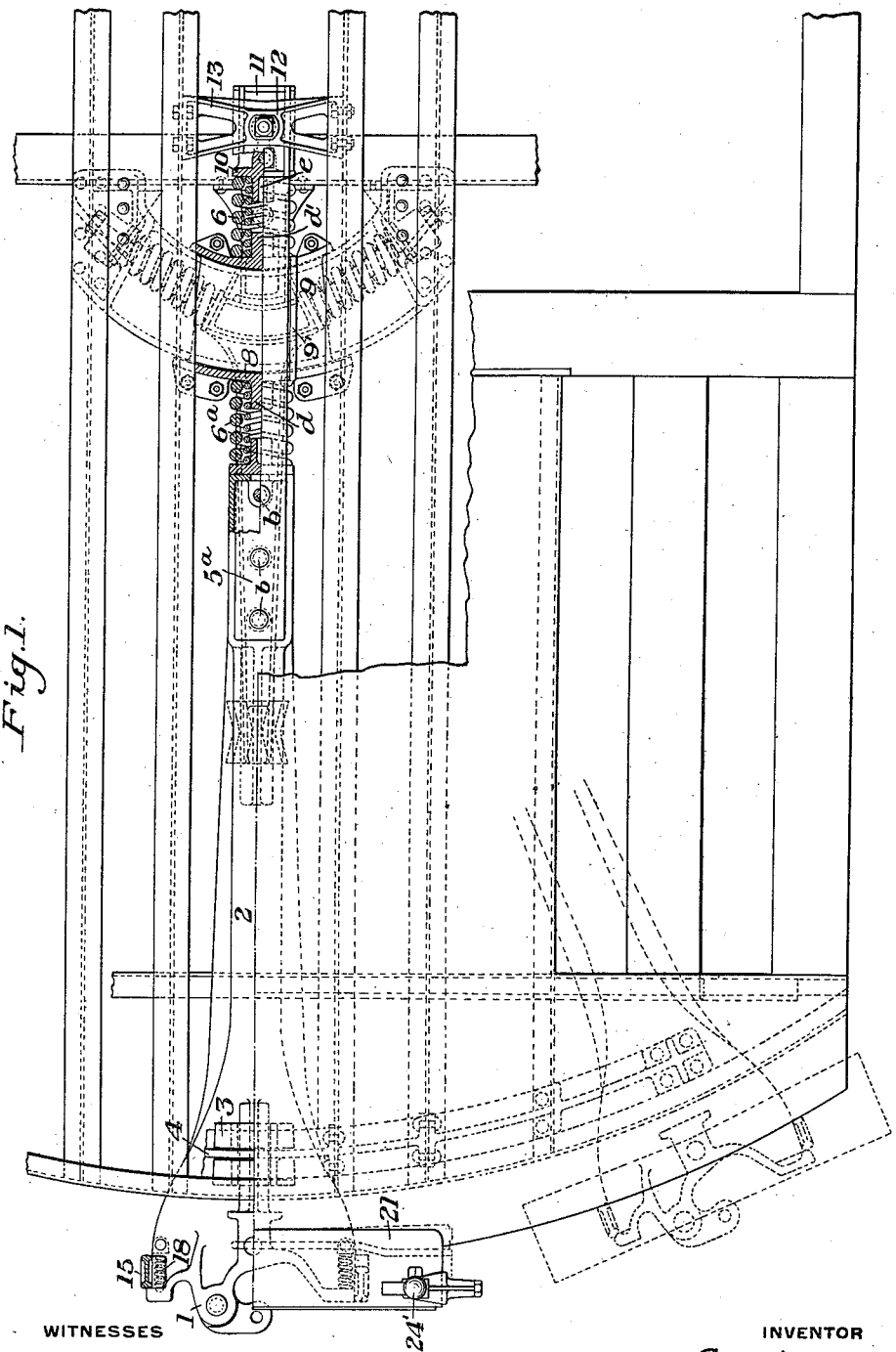

E. H. SCHMIDT.
RADIAL DRAFT GEAR.
APPLICATION FILED JAN. 27, 1909.

1,013,073.

Patented Dec. 26, 1911.

5 SHEETS—SHEET 1.

WITNESSES

INVENTOR

E. H. SCHMIDT.
RADIAL DRAFT GEAR.
APPLICATION FILED JAN. 27, 1909.
1,013,073.
Patented Dec. 26, 1911.
5 SHEETS—SHEET 2.
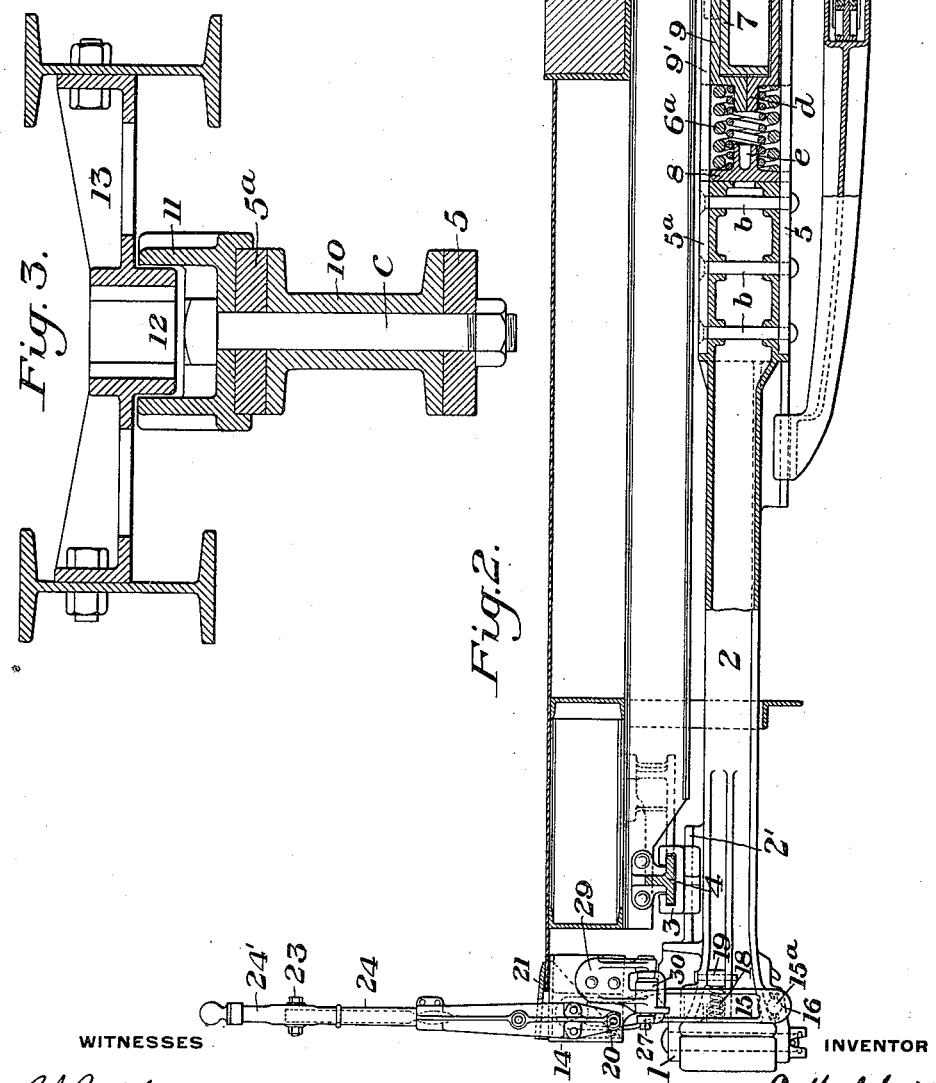
WITNESSES
INVENTOR E. H. SCHMIDT.
RADIAL DRAFT GEAR.
APPLICATION FILED JAN. 27, 1909.
1,013,073.
Patented Dec. 26, 1911.
5 SHEETS—SHEET 3.
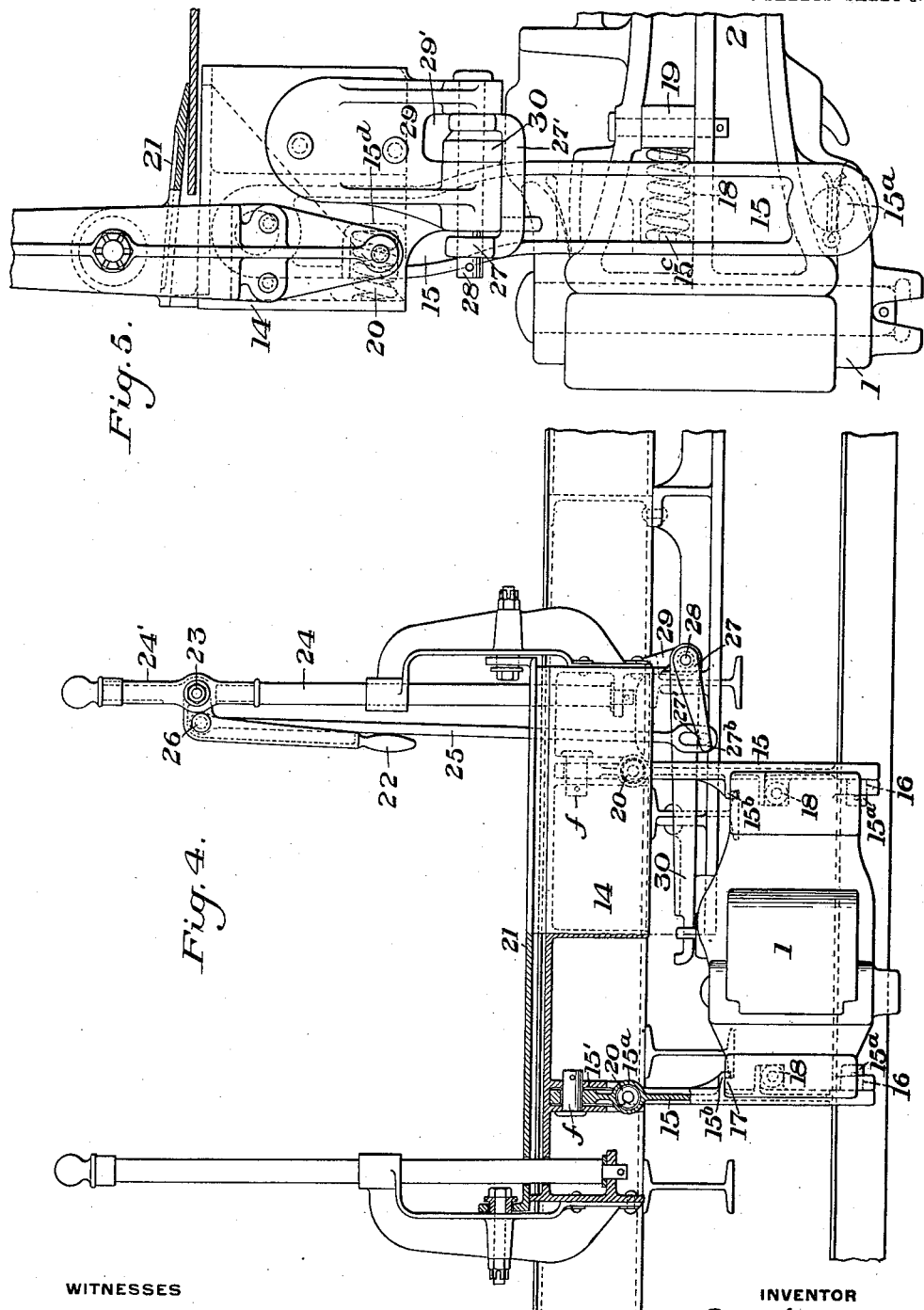
WITNESSES
INVENTOR E. H. SCHMIDT.
RADIAL DRAFT GEAR.
APPLICATION FILED JAN. 27, 1909.
1,013,073.
Patented Dec. 26, 1911.
5 SHEETS—SHEET 4.
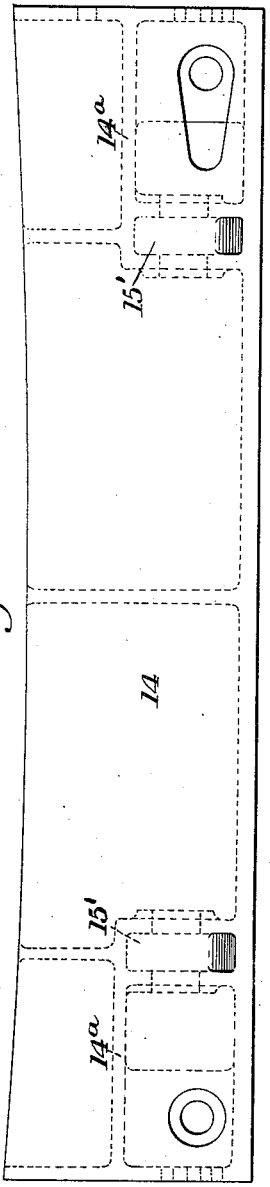
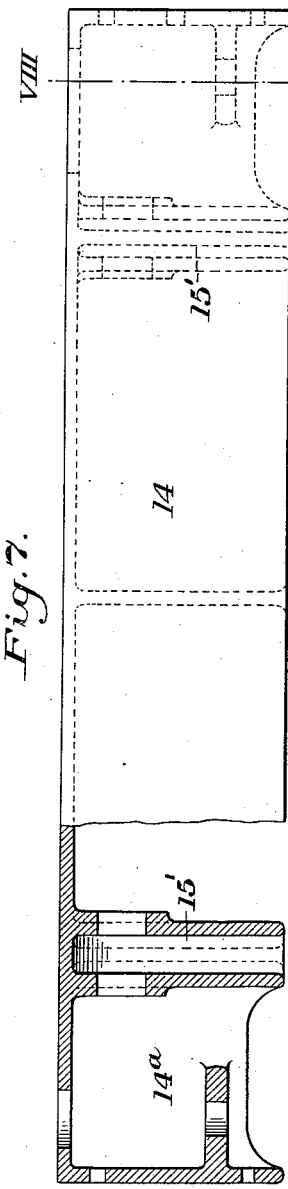
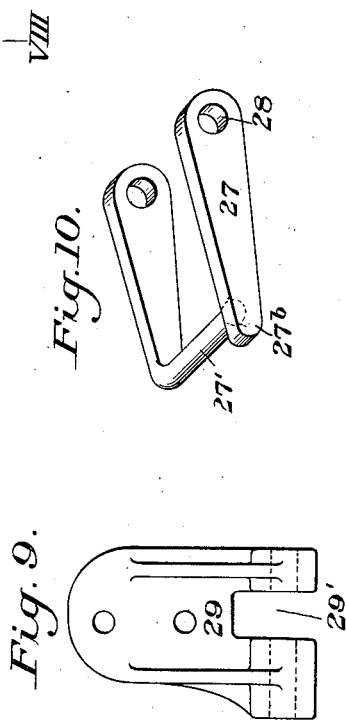
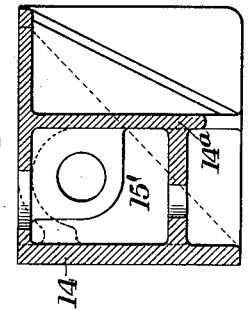
WITNESSES
INVENTOR E. H. SCHMIDT.
RADIAL DRAFT GEAR.
APPLICATION FILED JAN. 27, 1909.
1,013,073.
Patented Dec. 26, 1911.
5 SHEETS—SHEET 5.
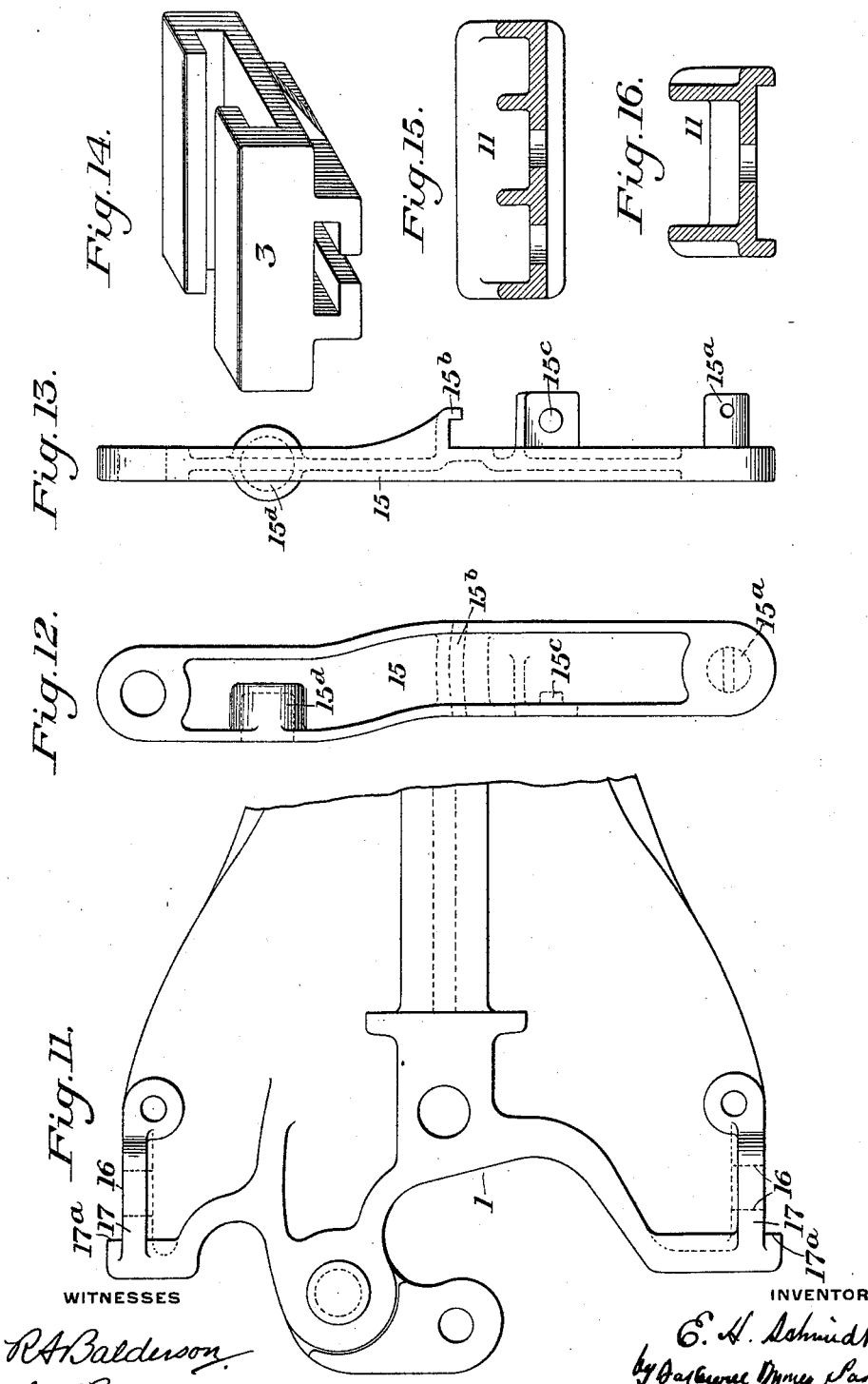
WITNESSES
R A Balderson
Y L Winters
INVENTOR
E. H. Schmidt
by Bakewell Byrnes Parmelee
his attys

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

RADIAL-DRAFT GEAR.

1,013,073.

Specification of Letters Patent.   Patented Dec. 26, 1911.

Application filed January 27, 1909.   Serial No. 474,470.

*To all whom it may concern:*

Be it known that I, ERNEST H. SCHMIDT, of Cleveland, Cuyahoga county, State of Ohio, have invented a new and useful Improvement in Radial-Draft Gears, of which the following is a full, clear, and exact description, reference being had to the accompanying drawings, forming part of this specification, in which—

Figure 1 is a plan view partly in section setting forth the improvements; Fig. 2 is a vertical horizontal section of the parts shown in Fig. 1; Fig. 3 is a vertical cross-section on the line III—III of Fig. 2; Fig. 4 is a front elevation partly in section showing more clearly the link connection between the coupler and dummy buffer; Fig. 5 is a detail view of parts shown in Fig. 4; Figs. 6, 7 and 8 are detail views of the dummy buffer casting, Fig. 6 being a plan, Fig. 7 a front elevation partly in section, and Fig. 8 a cross-section on the line VIII—VIII of Fig. 7; Fig. 9 is a detail view of the bracket, to which the uncoupling mechanism is secured; Fig. 10 is a perspective view of the lever; Fig. 11 is a plan view of the coupler head showing the shoulders and lip to which the pivotal links are secured; Figs. 12 and 13 are detail views of the pivotal link; Fig. 14 is a perspective view of the carrier iron; and Figs. 15 and 16 are sectional detail views of the slotted head.

As is shown in the drawings, the coupler 1 has a rearwardly extending shank 2, preferably of ordinary rectangular shape in cross-section, and supported at its forward end by a carrier 3 and a support 4. The support 4 is a curved segment arranged above the coupler shank and having laterally projecting flanges, and the carrier 3 is lipped over it and is also lipped around a longitudinal slideway 2' on the top of the coupler shank, so that the coupler is free to move longitudinally in buffing and draft through the carrier and is also free to move transversely on the support 4 in its radial motion described below.

The rear end of the coupler shank has a yoke 5, 5ᵃ made in two members which are fixed to the shank by rivets *b* or otherwise at their forward end, and at the rear end have an interposed follower 10. Above the upper arm 5ᵃ of the yoke is a head or casting 11, and parts 5, 5ᵃ, 10 and 11 are secured together by means of through-bolts *c*. The head 11 has a longitudinal slot fitting over a pivot stud 12 which projects from a block or casting 13 on the car frame and forms the pivotal center on which the draft gear is adapted to move radially, the slot in the part 11 permitting the draft gear to move longitudinally back and forth on the stud 12.

7 is a curved segment which is fixed to the car sill and extends transversely between the arms, 5, 5ᵃ of the yoke, and on this segment is mounted a sliding sleeve 9 having vertically projecting lips or flanges 9' which engage the sides of the members 5, 5ᵃ of the yoke and hold the sleeve in place on the yoke. The sleeve therefore travels with the arms of the yoke in their radial motion along the segment 7.

At the front and rear faces of the sleeve 9 are spring seats *d*, *d'* which receive the springs 6, 6ᵃ, and these springs bear, respectively, at their front and rear ends, against spring seats *e* on the front and rear followers 8 and 10. These springs are preferably made double, as shown in the drawings, and may be of equal strength, or the forward spring 6ᵃ may be of less resisting strength than the rear spring 6 for purposes described in the patent of Harry T. Krakau, No. 984,937, issued February 21st 1911, of which this device is an improvement.

In order to prevent buckling of two of my draft gears when coupled together I provide the coupler head 1, at its sides, with lateral stops or flanges 1' at each side of the recess for the knuckle. The projections on one coupler are adapted to engage the projections on the opposing coupler and thus to keep the coupler shanks sufficiently in line to prevent buckling when under buffing strains. The buffing strains are transmitted through the couplers to the forward spring 6ᵃ, which is compressed against the sleeve 9, and the force of pulling is transmitted to the rear spring 6, which is compressed against the rear face of the sleeve 9, the forces of buffing and draft being transmitted through this sleeve to the curved segment 7, and the slotting of the part 11 permitting the draft gear to move freely forward and backward.

For the purpose of providing a continuous passageway from the platform of one car to the platform of another, I prefer to use a dummy buffer, shown in detail in Figs. 5, 6, 7 and 8. 14 is the main buffer casting and is supported near each end by a vertical arm 15 whose upper end is pivotally attached within a recess 15' by means of a pin and cotter $f$. The lower end of the arm 15 is pivotally attached to the side of the coupler head by a pin $15^a$ which enters a hole 16 in the side of the coupler head. The arm 15 has a lip $15^b$ fitting over a lug 17 at the side and top of the coupler head, and when the arm is adjusted to this lug and secured at the bottom by means of the pin $15^a$ its lateral displacement is prevented by the lip $15^b$ and lug 17. When the arm 15 has been set in place a spring 18 is inserted between the arm and a filler block 19 which is fastened between the lateral ribs of the coupler head. This filler block preferably has a spring seat on its forward face for the spring 18, and the forward end of this spring is held by a spring seat $15^c$ formed on a bracket on the arm 15. The shoulder $17^a$ on the side of the coupler head (Fig. 11) limits the forward motion of the arm 15 when it is acted upon by the spring 18, which normally holds the arm against the shoulder.

When two cars meet, the main buffer castings 14 are caused to engage and thereupon move rearwardly and move the upper ends of the arms 15 rearwardly upon their pivotal centers $15^a$, thus compressing the springs 18 until the knuckles of the couplers engage and are coupled. The springs 18 being then under compression, will keep the buffers in engagement until the cars are again uncoupled, for the buffers 14 move longitudinally with the couplers in buffing and draft.

In order to maintain the forward face of the buffer casting 14 in a vertical plane, I employ a spring 20 set within a recess $15^d$ on the forward face of the arm 15 and pressing at its forward end against the rear surface of the face of the buffer casting 14. The wall $14^a$ on the main buffer casting presses against the rear surface of the arm 15 and keeps the spring from forcing the lower part of the wall of the buffer face too far forward; but the spring will press the lower part of the buffer as far forward as this wall will permit, and therefore maintains it in vertical position.

21 is a foot plate.

In order to operate the locking and opening mechanism of the coupler I employ an operating lever handle 22 which is pivoted at 23 to a portion 24' of the hand rail column 24. This column is mounted on the dummy buffer 14 and the handle 22 is hollowed on its under side so as to fit in its lower position around the rod 25, to which it is pivoted at 26. At the lower end the rod 25 is looped and incloses the arm 27' of the U-shaped lever 27.

The arms of the lever 27 are pivoted at 28 to a bracket 29 on the platform, and the extension $27^b$ on the lever 27 prevents the end of the arm 25 from sliding out of place. The arm 27' passes beneath the uncoupling lever 30, which is pivoted to the bracket 29 within the recess 29', and at its other end it engages the mechanism of the coupler. This construction enables the parts to be operated merely by raising the operating handle 22 without subsequently turning it, as in prior constructions. When the handle 22 is raised it also raises its pivotal connection with the arm 25, and this in turn raises the arm 27' and the arm 30 and operates the parts of the coupler. The uncoupling arm 30 is attached to the bracket 29 with sufficient freedom to permit relative longitudinal movement of the coupler without straining the parts.

Within the scope of my invention as defined in the claims modifications may be made in the form and construction, since

What I claim is:—

1. The combination with a radially movable coupler, of a dummy buffer overlying and connected to said coupler, the connection between the coupler and buffer being arranged to allow a rearward movement of the main body of the buffer as a whole, relative to the coupler, said buffer coöperating with a similar buffer of an adjacent car to provide a continuous passageway from the platform of one car to the platform of the next.

2. The combination with a radially movable coupler, of a dummy buffer overlying and supported from said coupler, the connection between the coupler and buffer being arranged to allow a rearward movement of the main body of the buffer as a whole, relative to the coupler, said buffer moving longitudinally with the coupler in buffing and draft and forming part of a continuous passageway from one car platform to the next.

3. The combination with a radially movable coupler, of a dummy buffer overlying and supported upon said coupler, the connection between the coupler and buffer being arranged to allow a rearward movement of the main body of the buffer as a whole, relative to the coupler, said dummy buffer being movable longitudinally with the coupler in buffing and draft and also being movable radially with said coupler and forming part of a passageway from one car platform to the next.

4. The combination with the radially movable coupler, of a dummy buffer located above the same and having pivotal link connection therewith arranged to allow a rearward movement of the main buffer body as a whole relative to the coupler.

5. The combination with the radially movable coupler, of a dummy buffer supported by the same, and springs arranged to hold the buffer in normal vertical position.

6. The combination with the radially movable coupler, of a dummy buffer supported by the same, springs arranged to hold the buffer in normal vertical position, and stops arranged to limit the movement of the buffer under the spring pressure.

7. The combination with the radially movable coupler, of a dummy buffer above and supported by pivotal links from the coupler, and springs between the link connection and the coupler.

8. The combination with the radially movable coupler, of pivotal links projecting upwardly therefrom, a dummy buffer supported on said links, and a connection between the links and the coupler arranged to prevent outward displacement of the links.

In testimony whereof, I have hereunto set my hand.

ERNEST H. SCHMIDT.

Witnesses:
 HARRY E. ORR,
 F. L. HICKOK.

Copies of this patent may be obtained for five cents each, by addressing the "Commissioner of Patents, Washington, D. C."